US008843236B2

(12) United States Patent
Barajas et al.

(10) Patent No.: US 8,843,236 B2
(45) Date of Patent: Sep. 23, 2014

(54) METHOD AND SYSTEM FOR TRAINING A ROBOT USING HUMAN-ASSISTED TASK DEMONSTRATION

(75) Inventors: Leandro G. Barajas, Harvest, AL (US); Eric Martinson, Alexandria, VA (US); David W. Payton, Calabasas, CA (US); Ryan M. Uhlenbrock, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 13/420,677

(22) Filed: Mar. 15, 2012

(65) Prior Publication Data

US 2013/0245824 A1 Sep. 19, 2013

(51) Int. Cl.
*B25J 13/08* (2006.01)

(52) U.S. Cl.
USPC .............................................. 700/253; 901/5

(58) Field of Classification Search
CPC ........... G05B 2219/40391; G05B 2219/40424; G05B 19/4061; G05B 19/427; G05B 2219/36404; G05B 2219/36442; G05B 219/37618; G05B 2219/40476; G06N 3/008; B25J 9/1664; B25J 9/163; G06T 13/40; G06T 2207/30196
USPC .......... 700/246, 250, 253, 257, 264; 901/3, 5, 901/8, 46
See application file for complete search history.

(56) References Cited

U.S. PATENT DOCUMENTS

| | | | |
|---|---|---|---|
| 8,315,740 B2* | 11/2012 | Hasegawa et al. ............ | 700/260 |
| 2007/0146371 A1* | 6/2007 | Dariush ........................ | 345/474 |
| 2008/0180448 A1* | 7/2008 | Anguelov et al. ............. | 345/475 |
| 2009/0271038 A1* | 10/2009 | Song et al. .................... | 700/259 |
| 2011/0208355 A1* | 8/2011 | Tsusaka ........................ | 700/246 |
| 2012/0053728 A1* | 3/2012 | Theodorus et al. ........... | 700/259 |
| 2013/0030570 A1* | 1/2013 | Shimizu et al. ............... | 700/259 |

FOREIGN PATENT DOCUMENTS

| | | |
|---|---|---|
| JP | 09325806 A | 12/1997 |
| JP | 2000218576 A | 8/2000 |

OTHER PUBLICATIONS

Dana H. Ballard et al., "Diectic codes for the embodiment of cognition", Behavioral and Brain Sciences (1197) 20, pp. 723-767.
Michael Pardowitz, Steffen Knoop, Ruediger Dillman, Raould D. Zollner, "Incremental Learning of Tasks From User Demonstrations, Past Experiences, and Vocal Comments" IEEE Transactions on Systems; Man, and Cybernetics-Part B: Cybernetics< vol. 37, No. 2, Apr. 2007, pp. 322-332.
Balaraman Ravindran, Andrew G. Barto, Vimal Mathew, "Deictic Option Schemes", IJCAI-07, pp. 1023-1028.

* cited by examiner

*Primary Examiner* — Jason Holloway
(74) *Attorney, Agent, or Firm* — Quinn Law Group, PLLC

(57) ABSTRACT

A method for training a robot to execute a robotic task in a work environment includes moving the robot across its configuration space through multiple states of the task and recording motor schema describing a sequence of behavior of the robot. Sensory data describing performance and state values of the robot is recorded while moving the robot. The method includes detecting perceptual features of objects located in the environment, assigning virtual deictic markers to the detected perceptual features, and using the assigned markers and the recorded motor schema to subsequently control the robot in an automated execution of another robotic task. Markers may be combined to produce a generalized marker. A system includes the robot, a sensor array for detecting the performance and state values, a perceptual sensor for imaging objects in the environment, and an electronic control unit that executes the present method.

15 Claims, 2 Drawing Sheets

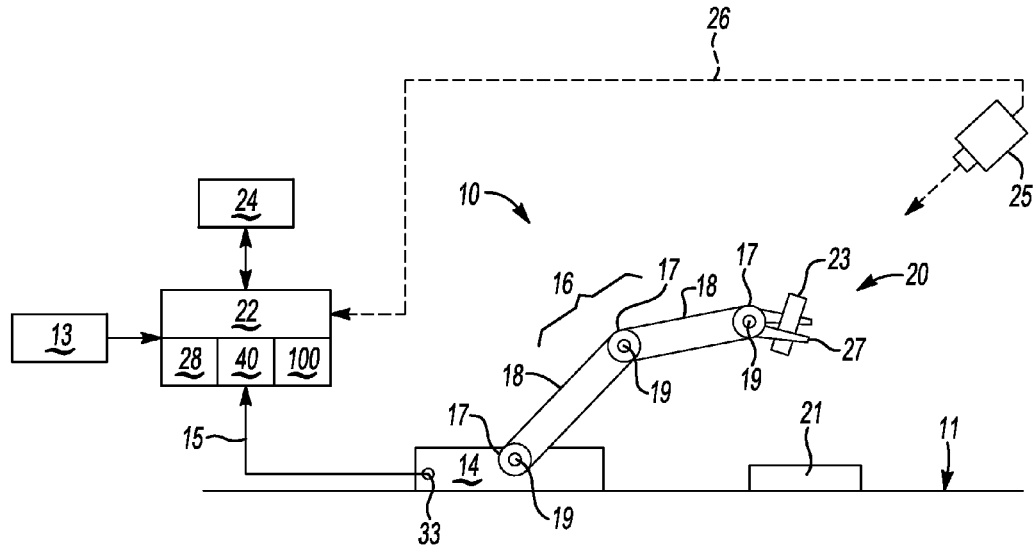
Fig-1
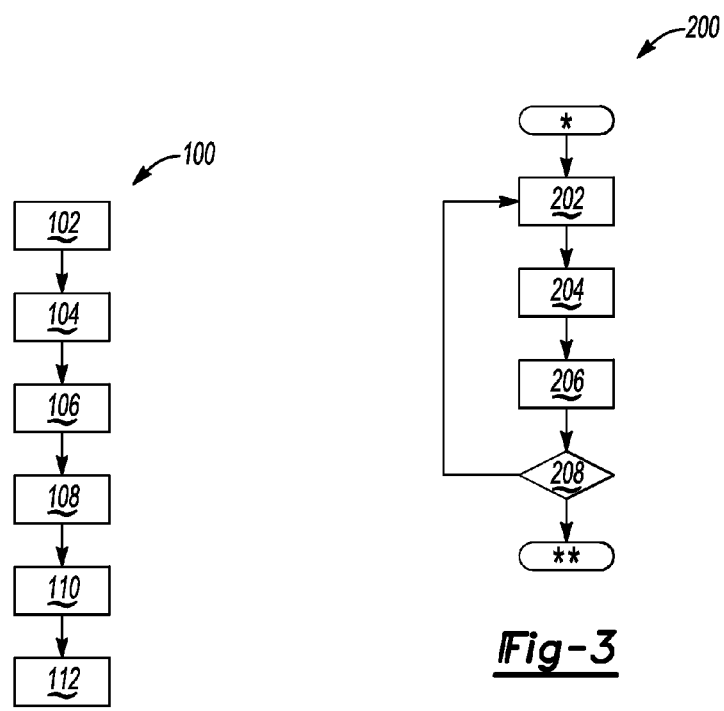
Fig-2
Fig-3

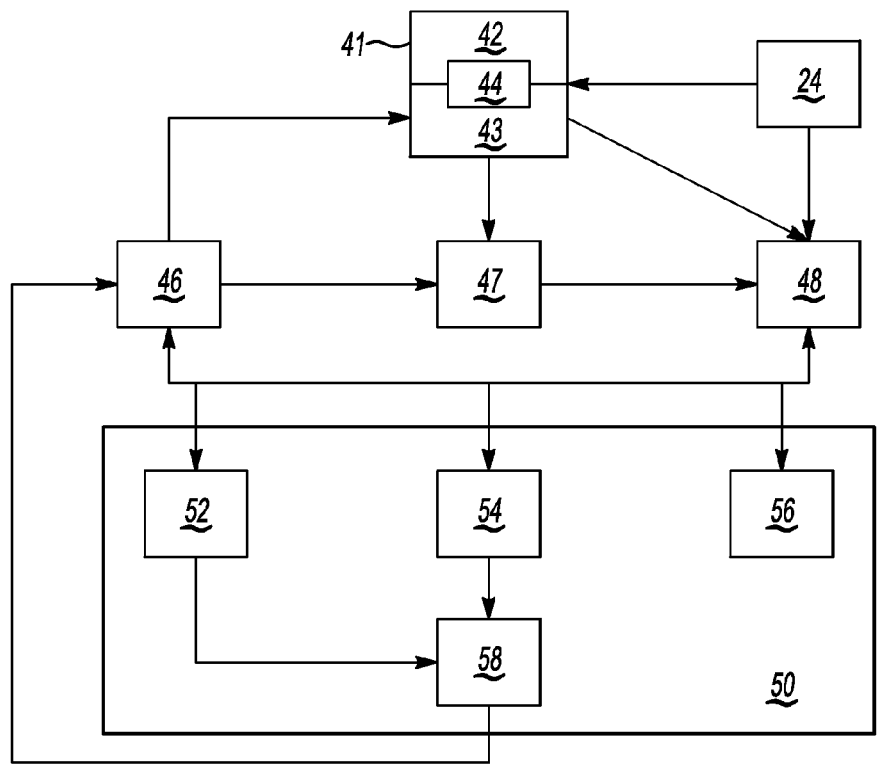
Fig-4
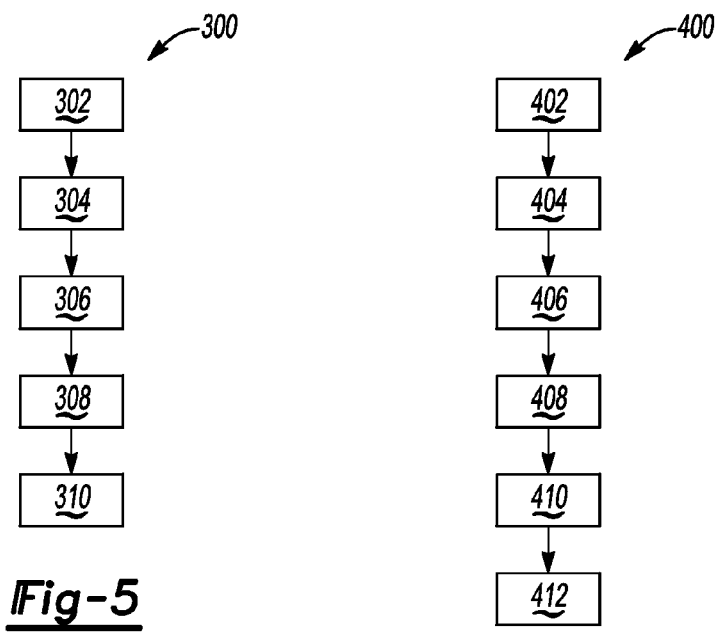
Fig-5
Fig-6

METHOD AND SYSTEM FOR TRAINING A ROBOT USING HUMAN-ASSISTED TASK DEMONSTRATION

TECHNICAL FIELD

The present disclosure relates to a method and system for training a robot using human-assisted task demonstration.

BACKGROUND

Robots are electro-mechanical devices that can manipulate objects using a series of robotic links. The robotic links are connected to each other by joints, each of which may be independently or interdependently driven by a joint motor and/or another suitable actuator. Each robotic joint represents an independent control variable or degree of freedom. End-effectors, which are also referred to as manipulators, are the particular end links used to directly perform a given work task or skill such as grasping a work tool, stacking one part with respect to another, etc. Precise motion control through the robot's various degrees of freedom may be organized by task level: object level control, i.e., the ability to control the behavior of a grasped object, end-effector control, and joint-level control. Collectively, the various control levels cooperate to achieve the required robotic dexterity and work task-related functionality.

A modification to an object handled by a robot in the execution of a task sequence typically requires relatively expensive retraining of the associated control hardware. This tends to be true even if the grasped object surfaces themselves have not changed. Similarly, changes to the positioning of the object in the robot's surrounding work environment as a result of error and/or relaxed operating rigidity may also require expensive retraining. However, existing robot manipulator control software is not easily retooled to meet changing flexibility requirements.

SUMMARY

A method and a system are disclosed herein for training a robot using human-assisted task demonstration and virtual deictic markers assigned to perceptual features of the robot's work environment. Conventional manipulators are typically designed to operate in a highly structured environment with a minimum of variability, often requiring specific movement trajectories. These trajectories must be manually programmed for each new robotic task. Even systems that incorporate sensor feedback for autonomous trajectory planning require significant programmer interaction to identify the robotic task, adjust the required movement parameters, set the required manipulator grasp positions, and adjust trajectories in critical locations. The present approach is intended to provide a specific mechanism for dynamically assigning work tasks to such manipulators, e.g., two-finger or multi-finger grippers.

In particular, the present method includes moving the robot through the robot's configuration space to demonstrate a work task, and recording motor schema describing a required sequence of behavior of the robot during the movement. The method also includes recording sensory data describing performance and state values of the robot while moving across the configuration space, and detecting perceptual features of objects located in the environment. Additionally, the method includes assigning the virtual deictic markers to these detected perceptual features, e.g., objects, locations, times, places, etc., with the markers later used to guide automated behavior of the robot. The assigned markers and the recorded motor schema are used to subsequently control the robot in execution of another robotic task.

In another embodiment, the method includes capturing data sequences of changing positions of a manipulator of the robot from operator-controlled movements of the robot, and extracting data segments from the captured data sequences. The data segments represent actions of the robot during execution of a given task. The method may include detecting objects in the work environment of the robot and assigning a virtual deictic marker to at least some of the detected objects, and/or other perceptual data such as time, place, locations, etc. This associates an observed object's spatial orientation in the environment with movements performed by the robot relative to that object. Thereafter, the markers are combined to produce a generalized marker. The generalized marker maintains a record of visual features common between the markers, along with rotational and translational offsets required for these markers to match.

The present approach teaches a robotic work task to a robot using a series of learned examples, each being human-demonstrated in some manner, and associated primitive moves or "task primitives". Example task primitives include moving from point A to point B, opening a gripper, closing a gripper, etc. Context-based action selection sequences perceptually guide movement between the primitives in a dynamic environment. The present approach can be quickly applied to new and different work tasks with minimal training or reprogramming of the robot.

The markers noted above are learned by the robot through direct human demonstration. For example, in a simple grasp of an object by a two-finger gripper, an operator may physically handle the gripper and move it into position so as to grasp the object at point A, or use an input device such as a joystick to backdrive the robot to the same effect. The operator then moves the robot arm and gripper to point B and opens the gripper, thereby depositing the object at point B.

All the while, the robot records perceptual data describing, for instance, the approach angle, the departure angle, the position, and the orientation of the object, e.g., using one or more 3D cameras, joint angle sensors, etc. The robot also records the forces or torques applied by the gripper to the grasped object, joint angles, and potentially other information. The robot learns precisely where the source object was placed without actually learning the exact path taken by the gripper. This information is filled in during post processing and execution from the motor schema and recorded markers.

A system is also disclosed that includes a robot having an arm and a manipulator connected to the arm, a sensor array which measures sensory data describing performance and state values of the robot, and a perceptual sensor which collects images of objects located in the environment. The system also includes an electronic control unit (ECU) in communication with the robot, the sensor array, and the perceptual sensors. The ECU includes recorded motor schema describing a sequence of behavior of the robot. The ECU is configured to execute the above method.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a robot and an electronic control unit (ECU) that assigns virtual deictic markers to features of the robot's operating environment as learned via human demonstration.

FIG. 2 is a flow chart describing a method for teaching the robot of FIG. 1 via human demonstration and marker assignment.

FIG. 3 is a flow chart describing skill recognition and marker assignment as used within the method of FIG. 2.

FIG. 4 is a block diagram of various logic elements used within the ECU shown in FIG. 1.

FIG. 5 is a flow chart describing robot grasp recognition used as part of the method of FIG. 2.

FIG. 6 is a flow chart describing cost estimation as used with the method of FIG. 2.

DETAILED DESCRIPTION

With reference to the drawings, wherein like reference numbers refer to the same or similar components throughout the several views, an example robot 10 is shown in FIG. 1. The robot 10 may include a base 14 that is positioned with respect to a surface 11. The robot 10 may include an arm 16 having one or more arm segments 18. An end-effector or manipulator 20 is positioned at an end of the most distal segment 18 of the arm 16 with respect to the base 14. The manipulator 20 may be, in an example embodiment, a gripper having a plurality of fingers 27 for grasping an object 23.

Robotic joints 17 may connect the various arm segments 18. Each robotic joint 17 may be driven by a joint actuator such as a motor 19 so as to move the manipulator 20 to desired positions during execution of a work task. Raw sensor data (arrow 15) describing robot performance values is relayed to an electronic control unit (ECU) 22 and used thereby to control the actions of the robot 10. The raw sensor data (arrow 15) describes performance and state values of the robot 10. Example raw sensor data (arrow 15) may include torque, force, speed, and acceleration of the manipulator 20.

To collect such data, a sensor array 33 may be connected to the robot 10, shown in FIG. 1 as connected to the base 14 for simplicity. The sensor array 33 may include transducers, torque sensors, accelerometers, position sensors, and the like. The sensor array 33 may include soft sensors which calculate certain values from other directly measured values, as is well understood in the art. Additionally, a perceptual sensor 25 may be positioned with respect to the robot 10 and configured to film, video tape, image, and/or otherwise record the behavior of the robot 10 in its operating environment as explained below.

The ECU 22 may be accessed via a user interface 24. The ECU 22 may include logic elements 40 as explained below with reference to FIG. 4 and any required process instructions suitable for executing the present method 100 as described below with reference to FIG. 2. The ECU 22 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics. An input device 13 may be separate from or integrated with the user interface 24. The input device 13 may be a 3D mouse, joystick, or other control device suitable for moving or back-driving the robot 10 through a human-demonstrated task as explained below.

Any computer-readable memory used in conjunction with the ECU 22 may include non-transitory/tangible memory that may be non-volatile or volatile. Non-volatile media may include, for example, optical or magnetic disks and other persistent memory. Example volatile media may include dynamic random access memory (DRAM), which may constitute a main memory. Other examples include a floppy, flexible disk, or hard disk, magnetic tape or other magnetic medium, a CD-ROM, DVD, and/or any other optical medium, as well as other possible memory devices such as flash memory.

The robot 10 of FIG. 1 is taught to execute a particular task sequence by human-assisted demonstration and learning. The ECU 22 does this by recording virtual deictic markers which indicate perceptual features of the work environment in which the robot 10 operates, i.e., the physical environment surrounding the robot 10. The markers can be related to objects in the environment, e.g., the object 23 or another object 21 as shown, locations, times, places, etc. The ECU 22 also records motor schema 28 in memory, with the motor schema 28 describing the required actions or skills of the robot 10. These motor schema 28 are guided by the markers in the automated execution of a work task to account for the actual environment of the robot 10 as perceived by the perceptual sensors 25 as described below.

The robot 10 learns required grasp positions and approach directions when learning to grasp an object, for instance the example object 23. That information is attached to the markers assigned by the ECU 22 at runtime to any perceptual features detected in the environment in which the robot 10 operates. As explained in detail below, the manipulator 20 first learns and records the required markers via human demonstration and then dynamically assigns the learned markers to detected perceptual features. This in turn allows for rapid adaptation to a changing environment while still completing multi-step assembly processes.

Theory of Learning

Repetition of any new assembly task can be broken into three distinct parts: the demonstration of the task by a human operator, such as grasping the object 23 and stacking the grasped object 23 on another object 21, a set of robotic skills and associated functions, and a support framework for extracting the required markers and assigning these markers at runtime to any other objects detected by the perceptual sensors 25, e.g., a 3D stereo camera, a high-resolution camera, and/or other sensors in communication with the ECU 22 via a wired or wireless communication channel 26.

Beginning with human demonstration, the present approach contemplates that a human operator physically moves the robot 10 of FIG. 1 through or across the configuration space, e.g., moving the arm 16 and/or manipulator 20 through all of the steps of a required task. This may entail using the input device 13 to move the robot 10, backdriving the robot 10, etc. For a simple grasp and pick up task, i.e., when the robot 10 uses the manipulator 20 to grasp an object 23 as shown, the operator first moves the manipulator 20 into place with respect to the object 23 and then correctly grips the object 23 using the manipulator 20, for instance by compressing the fingers 27 with sufficient force to establish a suitable grasp pose. The operator then moves the arm 16 and manipulator 20 to thereby pick up and move the object 23. As is understood in the art, the term "configuration" describes a pose of the robot 10, while the term "configuration space" refers to the set of all possible configurations for the robot 10. The configuration space may range from a simple plane to a special Euclidean group depending on the complexity of the robot 10. If the robot 10 is a fixed-base manipulator with N revolute joints and no closed-loops, the configuration space (C) is N-dimensional for that robot.

Although the robot 10 of FIG. 1 could potentially identify task sequences and some relevant perceptual data simply by observing a human operator performing the task, one of the most challenging parts of handling new objects and creating new assemblies is determining where to place the manipulator 20 and how to get the tool center point (TCP) into the correct place. By having a human operator manually move the arm 16 and manipulator 20 through each task while the robot 10 records its own raw sensor data (arrow 15) via the ECU 22, each demonstration provides a data stream of experiences (T) from which the robot 10 can solve these difficult problems in post-processing, that is, the step immediately subsequent to human-assisted learning.

With respect to robotic skills, behavioral imitation of a demonstrated work task is based around recognizing and repeating known robotic skills such as grasping the object 23, dropping the object 23, etc. Each skill in the repertoire of the robot 10, which may be embodied as motor schema 28 recorded by the ECU 22, can be defined by four generic functions: a recognition function, a predictor function, a cost estimation function, and motor schema 28. For purposes of imitation the origin of each skill is unimportant. It could be either learned or pre-programmed. The four generic functions noted above may be represented as follows:

$$\text{recognizer}_i(T) \Rightarrow \{ts_a, M_a, E_a\}$$

$$\text{predictor}(M_a, P_b, W_t) \Rightarrow W_{t+1}$$

$$\text{estimator}_i(M_a, E, W_t) \Rightarrow \text{cost}_{a,b}(t), \forall P_b \in W_t$$

$$\text{motor\_schema}_i(M_a, P_b, W_t) \Rightarrow J(t+1)$$

The recognizer function, i.e., $\text{recognizer}_i(T)$, identifies 1) the earliest time step ts in the recorded data stream T at which the skill is completed; 2) a floating marker $M_a$ containing information necessary for task-specific execution of skill i; and 3) a recognized end-state E for the manipulated object, e.g., the object 23, which may be grasped by the robot 10 and placed on another object, e.g., the object 21. The information contained in the floating marker $M_a$ is specific to each skill, but may contain a manipulation object type, an approach vector, a grasp position, a departure or exit vector, etc. In general, each marker $M_a$ contains all of the knowledge necessary for the motor schema 28 of FIG. 1 to repeat the task except for a specific manipulation target. That target is assigned at runtime to relevant perceptual objects using the data in the marker.

The prediction function, i.e., predictor $(M_a, P_b, W_t)$, identifies the expected end-state as a result of assigning a marker $(M_a)$ to a particular visually detected object. The current state of the world, $W_t$, may be defined as:

$$W_t = \{P(t), J(t), \text{sensors}(t)\}$$

where P(t) is the set of all objects visually identified and localized in time step t, J(t) is the most recent joint angle configuration of the robot 10, and sensors(t) is the set of data returned by all other available sensors used in conjunction with the robot 10. The prediction function then identifies $W_{t+1}$. This allows runtime marker assignment conducted by the ECU 22 to penalize marker assignments which will not lead to another marker assignment in the future.

The cost estimation function, i.e., $\text{estimator}_i(M_a, E, W_t)$, is then the runtime mechanism for identifying the best perceived object to which to assign a marker $(M_a)$. This function returns the cost of assigning the extracted marker $M_a$ to all objects in the set P, given $W_t$ and the set of all recognized end-states E. If the knowledge is available, the cost estimation function may include penalties for hard to reach or impossible to reach positions given the manipulator's position and/or obstacle placements in the environment.

Finally, the deictic motor schema 28 of FIG. 1, i.e., $\text{motor\_schema}_i(M_a, P_b, W_t)$, uses the extracted marker $M_a$, an assigned object $P_b$, and the current state of the world $W_t$ to determine the next joint angles J(t+1) to be sent to the robot 10. In general, this final function assumes that the ECU 22 is a relatively fast-update reactive controller so as to respond quickly to any changes in the environment or the assignment object. The actual configuration of the ECU 22 is not important, provided there exists some way of estimating the current joint angles of the robot 10 so as to alter robotic movement when markers $(M_a)$ are re-assigned at runtime.

Supported Learning

Referring to FIG. 2, the present method 100 is described with respect to learning a simple pick and place operation, for instance a task in which the object 23 of FIG. 1 is to be stacked on top of the object 21. The method 100 begins with step 102, wherein the human operator selects a source object, in this example the object 23, and a destination object, which in this case is the object 21.

At step 104, the position and orientation of the object 21 is recorded via the perceptual sensors 25 of FIG. 1. Step 104 may include activating one or more 3D cameras or other devices to record, in real time, the position and orientation. As will be understood in the art, image processing software may be used to provide feature recognition.

At step 106, the operator then physically moves the robot across its configuration space (C). For instance, the arm 16 and/or the manipulator 20 may be moved either manually by direct contact and an applied force, or indirectly via the input device 13 of FIG. 1, or using a combination of the two. This moves the arm 16 and manipulator 20 to the desired position.

At step 108, the raw sensor data (arrow 15) of FIG. 1 is fed to the ECU 22 to provide performance and state value information, possibly including but not limited to force and torque applied to the manipulator 20. The perceptual sensors 25 can also be used to determine approach and exit angles, i.e., the angle at which the manipulator 20 respectively approaches and moves away from the object 23 at the grasp and release stages of the task. Step 108 may entail capturing data sequences of positions of the manipulator 20 from the operator-controlled movements of the robot 10, possibly also using the perceptual sensors 25.

At step 110, the ECU 22 executes post-processing to assign markers to objects in the environment describing the perceptual features detected at step 108. As noted above, the markers are virtual, and thus are recorded via the ECU 22 to relate the perceived features to, for example, object features, locations, places, start/stop times, and the like.

At step 112, the ECU 22 controls the robot 10 in a subsequent task using the markers of step 110 to guide the recorded motor schema 28. The robot 10 can thus repeat the learned maneuver using the recorded markers and schema, with the schema defining task primitives such as "pick up object", "drop off object", "move from point A to point B", etc.

Step 112 may entail using a cost function and grasp recognition analysis to determine how best to guide the motor schema 28 via the markers in the best manner, given up to date knowledge of the environment in which the robot 10 operates. Therefore, step 112 may be broken into different subtasks as described below with reference to FIGS. 3-6.

The present imitation learning problem is focused on supporting the recognition of robotic skills and real-time assignment of markers to detected objects in the environment of the robot 10. This problem is divided into two distinct areas: skill recognition and marker assignment. Each of these will now be discussed in turn with reference to FIG. 3.

Skill Recognition

Given a set of known skills with recognizer functions R, wherein R returns the earliest time step at which a skill is completed, the following iterative method 200 usable as part of method 100 parses the training data stream, T, to identify robotic skills. After starting (*), step 202 includes using the ECU 22 of FIG. 1 to run all recognizer functions R to find the particular motor schema 28, i.e., skill i, which happens first, and also the point in time, $ts_a$, at which the recognized skill is finished. For instance, a robot 10 may know three different grasp types for an object in the form of a cube, and thus the three grasps represent three schema or skills.

At step 204, the learned marker $M_a$ created by the recognizer $R_i$ is saved to a set of valid markers m. For example, there may be three valid markers corresponding to the three grasp types in the example of step 202.

At step 206, the ECU 22 removes all of the training data through $ts_a$ from the data stream T.

At step 208, the ECU 22 determines whether any additional actions are detected in the data stream T. If additional actions are detected, the method 200 repeats step 202. Otherwise, the method 200 is finished (**).

The end result of the iterative process, embodied herein as the example method 200, is a set of markers m learned from a single training session T. If there exist more than one training session covering the same demonstration, then the method 200 could be repeated for all training sessions, growing the set of markers m each time. Generalized knowledge of the task sequence may be inferred from multiple examples as explained later hereinbelow.

Marker Assignment

The marker assignment step 204 noted above occurs at runtime after all markers have been extracted and the robot 10 of FIG. 1 has been instructed to repeat a particular task. This step assumes a perceptual function which returns the type, position, and orientations of all detected objects in the environment in a regular update loop. Given known object models, such as CAD drawings of vehicle parts, model-based object recognition and position identification by two or more cameras, e.g., perceptual sensors 25 of FIG. 1, is feasible and robust to the presence of noise. Provided such object relative information is available, the assignment of markers to a particular object is a search to find the combination of marker $M_a$ and object $P_k$ with the lowest cost, $d_{a,k}$, using the perceptual assignment function for the appropriate skill.

At step 204, for each marker $M_a$ the ECU 22 of FIG. 1 finds the perceptual object $P_k$ having the minimum completion cost. The cost to account for future marker assignment may be adjusted by predicting $W_{t+1}$, for instance as follows:

$$\text{total\_cost}(M_a, P_b) = cost_{a,b}(t) + \sum_{i=i}^{n} \min[\text{estimator}(M_x, P_y, W_{t+i})]$$

The ECU 22 then identifies the combination $\{M_a, P_k\}$ having the lowest overall cost, adding a small negative value to the combination used in the previous time step as a hysteresis value to prevent oscillation. The ECU 22 then sends the identified marker/assigned object position to a behavioral loop for execution by a deictic motor schema $S_i$ associated with the marker $M_a$ which may be recorded in memory. The marker with the lowest execution cost may be passed on to the behavioral control module of FIG. 4. The logic elements 40 of FIG. 4 will now be described in further detail.

Implementation

FIG. 4 illustrates example logic elements 40 of the ECU 22 of FIG. 1. The present approach may be implemented, for example, on the Microsoft Robotics Developer Software (MRDS). The logic elements 40 shown schematically in FIG. 4 are those specifically directed toward imitation learning, and thus other unrelated hardware and software elements of the ECU 22 are omitted for simplicity and clarity.

Perception in the ECU 22 of FIG. 1 is a mix of capabilities, each using real-time feedback from various robotic sensors for active control, images from simulated cameras, and object positions retrieved directly from the ECU 22. The following description relates to a single robotic skill, i.e., a simple grasp. In general, the grasp skill provides a good template for implementing robotic skills, as release from the grasp is a similar task, and as other skills such as compound actions can be constructed as an extension of grasping and releasing.

At one level, the logic elements 40 include various hardware drivers 50 for the robot 10 of FIG. 1. Example hardware drivers 50 may include an arm driver 52, a manipulator/gripper driver 54, a 3D motion control driver 56, e.g., a driver for a 3D mouse, joystick, etc. of the input device 13 shown FIG. 1, and any required simulation drivers 58. The drivers 50 are in communication with a number of control modules that control the required tasks of the robot 10 shown in FIG. 1. These control modules may include an object perception module 46 providing such tasks as data collection, feature extraction, and synchronization, possibly using any cameras included within the perception sensors 25 of FIG. 1. A tracking module 47 may perform object tracking tasks, e.g., of the object 23 of FIG. 1 as it moves within a work area in execution of a task sequence. The tracking module 47 searches for and extracts objects and/or features from the perceptual data as directed by learning. A behavioral control module 48 moves the robot 10 to a target location or goal while avoiding obstacles, and also interfaces with the manipulator 20.

Each of these control modules 46, 47, and 48 is in communication with a top-level learning module 41. The learning module 41 records perceptual data in a database 44 during training and uses the recorded perceptual data in the future to direct perceptual attention and behavioral control through marker and task assignment. The learning module 41 may include a passive services module 42 and an active services module 43. The passive services module 42 may handle task learning and generalization, e.g., the core steps of observing human operator-directed start and stop positions, approach and departure angles, etc. The active services module 43 may be used for planning of training, error detection, marker assignment, and the like. The user interface 24 provides an access point to the learning module 41 and the behavioral control module 48 in the example embodiment of FIG. 4.

Grasp Recognition

Referring to FIG. 5, an example method 300 is shown to illustrate steps required for grasp recognition in execution of a subsequent automated task, for instance when executing step 112 of FIG. 3.

Beginning with step 302, a training session is loaded into memory of the ECU 22.

At step 304, the associated recognizer functions as described above for all known motor schema/skills for the loaded session are then run by the ECU 22 of FIG. 1.

At step 306, the marker associated with the earliest completed recognized skill is then saved, e.g., in the database 44 of FIG. 4. An example recognizer implementation is described here for a simple two-finger grasp skill. Implementation of the recognition function for a basic grasp skill is straightforward, as there is a specific, detectable point in time at which the robot 10 transitions from an open gripper to a closed gripper. If feedback from the manipulator 20 is available, then the detected presence of an object within the manipulator 20 can be integrated into the recognizer. The time step at which this transition occurs in the data stream T is represented as the grasp point $ts_{grasp}$. This time plus a constant offset is returned to the learning module 41 of FIG. 4 to indicate the detected completion of a recognized skill.

The recognizer function also returns a marker $M_a$ to be assigned to perceptual objects at runtime. This marker should contain enough information for the cost estimation function to predict the cost of grasping the object, and for the generic motor schema to duplicate the demonstrated grasp on an object to which the marker has been assigned. For a grasp skill, the unique information to be extracted from the human demonstration is the object type, the final position of the robot 10 relative to the object, i.e., the grasp position, and the object-relative direction from which to approach the grasp position.

Step 308 entails identifying the grasp position. This position is the simplest to identify, as the point in the datastream T is known at which the robot 10 begins grasping the object, e.g., object 23 of FIG. 1. Identifying the grasp position may entail identifying the global position, $X_{robot}$, and base-relative orientation matrix, $R_{robot}$, of the robot end-effector, i.e., the manipulator 20, by extracting the joint angles recorded at time-step $ts_{grasp}$ and applying forward kinematics models such as Denavit-Hartenberg model. The object 23, and therefore the object-type O, is identified by selecting the object with a recorded position at timestep $ts_{grasp}$ closest to the closed manipulator 20. If available, visual feedback identifying the grasped object could also be extracted later in the data stream to reduce the chance of error.

At step 310 of FIG. 5, the ECU 22 of FIG. 1 converts movement parameters to an object relative reference frame for identification of movement targets given an assigned deictic marker position:

$$m_{target\_rotation} = R_{robot}(ts_{grasp}) * R_{object}^{-1}(ts_{grasp})$$

$$\vec{m}_{target} = (\vec{X}_{robot}(ts_{grasp}) - \vec{X}_{object}(ts_{grasp})) * R_{object}^{-1}(ts_{grasp})$$

Identifying the direction from which to approach the grasp point is more difficult because it is unknown how the "approach" begins in T. Knowing the approach direction is important so as to prevent knocking over the object with the attached tool as the manipulator 20 moves into place. One option for identifying this start point for the approach path is to find an earlier time step in the recorded data stream at which the robot still needs to travel a minimum distance to reach the desired grasp location:

$$\vec{X}_{app} = \vec{X}_{robot}(ts_{app}) - \vec{X}_{robot}(ts_{grasp}),$$

such that $$|\vec{X}_{app}| > travel\_dist_{min}$$

Given the known object models used with the perceptual system, we can improve on this simple minimum distance model by incorporating the size of the grasped object D in three dimensions to account for variable sizes.

$$Box = \vec{k} + \vec{D}_{original}(O) * R_{object}(ts_{grasp})$$

This returns a rotated bounding box surrounding the grasp point beyond which the robot end-effector must move to avoid bumping into the target object. The vector k is a constant offset, typically of the same value for all dimensions, to allow for additional error such as gripper size or maneuvering room.

A problem with this method for identifying an approach direction is that it assumes the human demonstrator traveled in a straight line to reach the target. While this is often true, it is not always the case. Even expert users have to readjust occasionally when the position of the manipulator 20 is misjudged, sometimes backing off and approaching the target object again. An arbitrary distance threshold from which to calculate a straight line approach ignores these corrections, and may not correctly capture a safe approach vector to the grasp point. For this reason, a filter may be used that is weighted by current velocity up to the first point outside the bounding box. This approach may be less likely to knock over an arbitrary-sized object.

$$\vec{X}_{app}(ts) = \vec{X}_{robot}(ts) - \vec{X}_{robot}(ts_{grasp})$$

$$\vec{F}_{app}(ts_{app}) = |\vec{X}_{app}(ts_{app})| * \left\| \sum_{i=ts_{app}}^{ts_{grasp}-1} \vec{X}_{app}(i) * |\vec{X}_{app}(i) - \vec{X}_{app}(i+1)| \right\|$$

Identifying the approach path at step 310 includes converting the approach path to an object-relative reference frame to simplify its use with assigned deictic markers in arbitrary positions:

$$\vec{m}_{approach} = (\vec{F}_{app}(ts_{app}) + \vec{X}_{robot}(ts_{grasp}) - \vec{X}_{object}) * R_{object}^{-1}(ts_{grasp})$$

The object relative end-effector position ($m_{target}$), rotation ($m_{target\_rotation}$), and approach direction ($m_{approach}$) are stored in the generated deictic marker along with the grasp object type to be used by the marker assignment and motor schema functions at real-time.

Estimating Grasp Cost

Given a set of markers extracted from the training data, the next important aspect of the learning module 41 of FIG. 4 is dynamically assigning markers to real objects, and thereby reactively selecting a skill for execution in response to the current state of the environment. To support this endeavor, the object perception module 46 of FIG. 4 may supply an updated world-state $W_t$ to learning on a regular update loop, in which all perceptual data has been analyzed to extract known object types and their positions, as well as indicate the most recent robotic configuration (i.e., joint angles and sensor information). Using $W_t$, the learning module 41 of FIG. 4 then identifies the cost of all possible marker/detected object assignments by calling the appropriate cost estimation function for each marker, and selects the assignment with the lowest overall cost. The lowest overall cost marker is passed along to the tracker module 47 and the behavioral control module 48 of FIG. 4.

An example of a cost estimation function implementation is provided in the form of the grasp skill estimator. The cost estimation functions or values of the ECU 22 of FIG. 1 that are received as inputs include: 1) a grasp marker generated by the recognizer function described above; 2) a set of valid end states specifying a desired positional and rotational offset between two objects, e.g., objects 21 and 23 of FIG. 1; and 3) the current state of the world, including the current joint angle configuration of the robot 10 and the set of all objects visually recognized and localized in this timestep. The goal of the grasp skill estimator function is to quantify the cost of picking up the specified object. In general, this cost estimation process identifies the change in distance required to grasp a known object, assigning penalties for unreachable target points or difficult to reach objects.

Referring to FIG. 6, the cost estimation function used in execution of the method 100 of FIG. 2 is illustrated via an example method 400. Beginning with step 402, the ECU 22 may filter out objects of the wrong type, and may assign an infinite cost to objects that are of a different type from the object type used in the provided marker.

Step 404 may include filtering out objects already in a valid end state, and assigning infinite cost to objects in the environment that are already correctly placed.

Step 406 may include identifying the requisite grasp point in global coordinates for each remaining object to be grasped:

$$R_{grasp} = m_{target\_rotation} * R_{object}$$

$$\vec{X}_{grasp} = \vec{X}_{object} + \vec{m}_{target} * R_{object}$$

$$\vec{X}_{approach} = \vec{X}_{object} + \vec{m}_{approach} * R_{object}$$

where $m_{target\_rotation}$, $m_{target}$, and $m_{approach}$ are taken from input marker M, and $R_{grasp}$ and $X_{grasp}$ are the target rotation matrix and grasp position for that object. $X_{approach}$ is the end-point of the line along which the robot end-effector should try to approach the grasp location to avoid knocking over the target object.

At step 408, the ECU 22 may use an inverse kinematic model of the robot 10 to identify the set of joint angles with the minimum change per joint necessary to achieve $X_{grasp}$ and $X_{approach}$. The cost $d_{a,b}$ for assigning marker $M_a$ to object $P_b$, not including penalties, is the Euclidean distance from the current end-effector position to the target position $X_{grasp}$.

The choice of cost estimation function is arbitrary. The change in joint angles was described above instead of the Euclidean distance, but this approach demonstrated potential problems in reaching all target objects. Although some objects are close enough in practice for a reactive motor schema to attempt a grasp of that object, the actual target point may be just out of reach according to the inverse kinematics of the robot 10, and so may result in an incorrect infinite value. Another solution therefore is to assign finite penalties for grasps believed to be out of reach, and to let the reactive motor schema controlling the robot 10 attempt those grasps if other, easier to grasp objects have already been picked up and placed in a proper end state.

Still referring to FIG. 6, step 410 may include assigning penalties for unreachable joint angle configurations. If the inverse kinematics function suggests that either the grasp point or the approach point are unreachable, one may assign a calibrated penalty to $d_{a,b}$.

At step 412, the ECU 22 can assign penalties for objects that are unreachable due to obstacles in the path of the approach vector. Such obstacles may be detected by various means, such as via the obstacle perception module 46 shown in FIG. 4.

Incorporating Visual Features

The above description assumes that all objects P are independent physical objects recognized and localized by an external visual recognition system. This system enables learning from human demonstration of manipulation tasks involving such objects, provided they are visible. Such a perceptual system, however, can cause problems when manipulating partially-assembled objects, or when handling objects with some rotational symmetry.

In the former case, the robot 10 of FIG. 1 may be unable to correctly identify what it is manipulating, because the robot 10 does not have a complete model of the partial assembly. For example, a door with inserted bolts may be impossible to distinguish from a door without such bolts if there is no perceptual model available for the door/bolt combination. In the latter case, an object with some rotational symmetry, either visually symmetric, i.e., leading to arbitrary direction results from a visual recognition system, or functionally symmetric, i.e., uniquely oriented visually but rotatable during manipulation without affecting the assembly, can cause the robot 10 to incorrectly penalize valid markers or discard them as being unreachable, leaving reachable objects in the workspace.

The answer to this problem is twofold. First, more visual features are needed to better represent the visual space. People can distinguish between many such problems using generic features such as corners, colors, or edges, so a robot requires these features in addition to object recognition capabilities. Second, the robot 10 needs the capability to generalize across multiple trials to identify those features that do not change between examples and add them to an existing perceptual model. In this fashion, the robot 10 learns what visual features besides the base object model are critical to the assembly task.

Generalizing a Marker

The present approach may be implemented using a simulated 3D visual imaging system mounted over the robot workspace. This provides a color image and range information from which corners and color blobs can be found within an image and localized in 3D. By default, the height of a detected feature is the highest point from the workspace within one pixel of the visual center. During training, these general features are added to the data stream T to be passed to the appropriate recognizers once the task demonstration is complete.

Skill Recognition

To allow for the presence of new visual features in the data stream, recognizer functions are adjusted to record all visual features, including objects of interest, at critical times such as grasping the object, or dropping it off. All features contain a type and 3D location, as well as rotation when available. To minimize computational load, the set of interesting visual features may be restricted to within a calibrated range of the grasp/release point.

Marker Generalization

A new generalizor function is then responsible for determining that two markers are the same, and finding the intersection of their two feature sets. The generalizor takes two markers as input and outputs a single new marker of the same type as the inputs. Because of practical variations between scenarios, one may elect not to discard the inputs, but rather can use the new generalized marker in parallel.

$$generalizor(M_a, M_b) \Rightarrow M_{new}$$

The generalizor solves a system of equations for the grasp skill. If two markers, $M_a$ and $M_b$, are actually the same example, then there should exist some translation $X_{transf}$ and rotation $R_{transf}$ that will transform $M_a$ into $M_b$. The challenge is identifying the set of matching features in both markers for which this transformation is true.

$$\vec{X}_{feature,b} = (\vec{X}_{feature,a} - \vec{X}_{robot,a}) * R_{transf} + \vec{X}_{transf}$$

$$R_{feature,b} = R_{transf} * R_{feature,a}$$

$X_{feature,b}$, $R_{feature,b}$ are the location and rotation of a single recorded feature, where implemented features include corners, color blobs, and objects of interest. If $M_a$ and $M_b$ are variations of the same general marker, then, using a Levenberg-Marquardt (LM) solver to solve for $X_{transf}$ and $R_{transf}$, the total error between the solved feature(s) position/rotation and the recorded positions in $M_b$ should be less than some threshold. Note that the rotational component of these equations is only included when a feature, including object location, is considered for inclusion. Furthermore, the rotational component of a feature with known orientation could be dropped independently of relative position using this separation, making symmetry investigations practical. Therefore grasping a cube needs four non-planar features, which could be three corners and an object centroid, or four corners, etc.

The above equations do not solve for the rotation of the robot gripper, e.g., manipulator 20 of FIG. 1, relative to the feature collection. After identifying a feasible set of matched features, an additional filter may be used to verify robot gripper rotations relative to the grasped object match for both markers.

$$\left| \begin{bmatrix} 1 \\ 1 \\ 0 \end{bmatrix}^T * R_{robot,a} * R_{transf} - \begin{bmatrix} 1 \\ 1 \\ 0 \end{bmatrix}^T * R_{robot,b} \right| < \text{thresh}$$

Cost Estimation with Generalized Markers

Cost estimation as described above does not change once a matched collection of features has been identified in the current perceptual space. To find those matched features, one may use the same LM-based problem solver to identify feature sets which match with a minimum of additional error. Their associated rotation then becomes the rotation of the "object" the robot needs to pick up. Using this new "object's" rotation, the cost estimation equations described above remain the same.

Searching Model Space

A major drawback to this visual feature based approach is the effects of occlusion. Corners located at the bottom of an object, for example, may not be visible at all locations in the workspace to an overhead camera due to the viewing angle. Similarly, other objects may hide visible features from a single camera. Therefore, generic models may be significantly impacted when using a specific set of visual features that are not always visible. In the case of object-specific features, as opposed to features created by the combination of two objects, a possible solution is to use a priori knowledge of feature locations obtained from the object model in conjunction with real-time object positions and rotation information returned by object tracking.

As opposed to generalized markers which depend on feature visibility, the object tracking system, e.g., tracking module 47 of FIG. 4, may use a cloud of visible features to identify the object from any angle. This cloud of features may be extracted a priori from either a detailed scan of the object or by rotating the object in front of the camera, i.e., part of the perception sensors 25 of FIG. 1. If at the same time one extracts the relative positions of biologically plausible features such as corners, edges, and/or color blobs, one can estimate in real-time the 3D positions of all such features as a transformation from the object's centroid, whether those features are visible or not. Now those features are always visible for matching purposes.

Imitation learning via the ECU 22 of FIG. 1 having the logic elements 40 of FIG. 4 provides a powerful tool for rapidly retraining a robotic workforce. As such, it is important for the development of flexible factories and assembly lines. Without a flexible learning representation, however, a human demonstration may not transfer correctly to a robotic partner. Deictic markers as described above provide such a flexible representation. Organized around skills that a robot knows very well, such markers can first be recognized in the human demonstration and then assigned in real-time to incoming perceptual data, thus guiding the robot through changing environments and even multi-step assembly tasks.

This approach may be used in various manipulator-based scenarios, including stacking, kitting, and peg-in-hole tasks. Furthermore, as noted above multiple demonstrations can be combined through logical inference to identify deictic markers with complex targets and symmetry conditions based on generic visual features such as corners and color blobs. Fast training of robots is thus enabled by use of predetermined task primitives for complex assembly tasks without expensive robot retraining, and without resorting to CAD models.

While the best modes for carrying out the invention have been described in detail, those familiar with the art to which this invention relates will recognize various alternative designs and embodiments for practicing the invention within the scope of the appended claims.

The invention claimed is:

1. A method for training a robot to execute a robotic task in a work environment, the method comprising:
   moving the robot across its configuration space through multiple states of the robotic task to thereby demonstrate the robotic task to the robot, wherein the configuration space is the set of all possible configurations for the robot;
   recording motor schema, via an electronic control unit (ECU), describing a sequence of behavior of the robot;
   recording sensory data, via the ECU, describing performance and state values of the robot while moving the robot across its configuration space;
   detecting perceptual features of objects located in the environment;
   assigning, via the ECU, virtual deictic markers to the detected perceptual features; and
   using the assigned virtual deictic markers and the recorded motor schema to subsequently control the robot, using the ECU, in an automated execution of the robotic task.

2. The method of claim 1, wherein moving the robot across its configuration space includes moving at least one of a robot arm and a robot manipulator attached to the robot arm.

3. The method of claim 2, wherein the manipulator includes a plurality of robotic fingers, and wherein moving the robot across its configuration space includes moving the robotic fingers.

4. The method of claim 1, wherein moving the robot across its configuration space includes manually backdriving at least one of a robotic arm and a manipulator of the robot.

5. The method of claim 1, wherein the robot is in communication with an input device, and wherein moving the robot across its configuration space includes commanding the movement via the input device.

6. The method of claim 1, wherein the input device is one of a joystick and a three-dimensional mouse.

7. The method of claim 1, wherein recording sensory data includes recording a force and a torque applied by the manipulator to an object grasped by the manipulator during demonstration of the task.

8. The method of claim 1, wherein detecting perceptual features of an object located in the environment includes using a camera to visually detect the perceptual features.

9. The method of claim 1, wherein using a camera to visually detect the perceptual features includes visually detecting a surface feature of the object.

10. The method of claim 9, wherein the camera is a three-dimensional stereo camera.

11. The method of claim 1, further comprising:
combining individual deictic markers to produce a generalized marker that maintains a record of perceptual features that are common between the combined individual markers, along with rotational and translational offsets required for the individual markers to match.

12. A system comprising:
a robot having an arm and a manipulator connected to the arm;
a sensor array which measures sensory data describing performance and state values of the robot;
a perceptual sensor which collects images of objects located in the environment; and
an electronic control unit (ECU) in communication with the robot, the sensor array, and the perceptual sensors, and which includes recorded motor schema describing a sequence of behavior of the robot, wherein the ECU is configured to:
record the sensory data describing performance and state values of the robot when the arm and the manipulator are moved across the configuration space of the robot by a human operator through multiple states of a robotic task;
detect perceptual features in the collected images from the perceptual sensor;
assign virtual deictic markers to the detected perceptual features; and
use the assigned virtual deictic markers and the recorded motor schema to control the robot in an automated execution of the robotic task.

13. The system of claim 12, wherein the ECU is further configured to:
selectively combine individual deictic markers to produce a generalized marker that maintains a record of perceptual features that are common between the combined individual markers, along with rotational and translational offsets required for the individual markers to match.

14. The system of claim 12, wherein the ECU is configured to capture data sequences of positions of the manipulator from operator-controlled movements of the robot.

15. The system of claim 12, further comprising:
an input device in communication with the ECU, wherein the arm and the manipulator are moved by the human operator during recording of the sensory data using the input device.

* * * * *